(12) United States Patent
Foster et al.

(10) Patent No.: US 7,214,259 B2
(45) Date of Patent: May 8, 2007

(54) INKS CONTAINING WATER-SOLUBLE PERYLENE DYES AND THEIR USE IN INK-JET PRINTING

(75) Inventors: Clive Edwin Foster, Manchester (GB); David Schofield, Manchester (GB); Helen Ava O'Shaughnessy, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 10/558,072

(22) PCT Filed: Apr. 7, 2004

(86) PCT No.: PCT/GB2004/001507

§ 371 (c)(1),
(2), (4) Date: Aug. 15, 2006

(87) PCT Pub. No.: WO2004/104117

PCT Pub. Date: Dec. 2, 2004

(65) Prior Publication Data
US 2006/0272546 A1    Dec. 7, 2006

(30) Foreign Application Priority Data
May 24, 2003    (GB)    .................... 0312067.2

(51) Int. Cl.
C09D 11/02    (2006.01)
B41J 2/01    (2006.01)
C07D 221/22    (2006.01)

(52) U.S. Cl. .................. 106/31.47; 106/31.32; 347/100; 546/37

(58) Field of Classification Search ............ 106/31.32, 106/31.47; 546/37; 347/100
See application file for complete search history.

(56) References Cited

U.S. PATENT DOCUMENTS

| | | | |
|---|---|---|---|
| 2,914,531 A * | 11/1959 | Staeuble et al. ............ 544/212 |
| 3,661,912 A * | 5/1972 | Kalz et al. .................... 546/37 |
| 3,697,526 A * | 10/1972 | Pugin .......................... 546/37 |
| 3,871,882 A * | 3/1975 | Wiedemann ............... 430/58.5 |
| 4,514,482 A * | 4/1985 | Loutfy et al. ................. 430/78 |
| 4,613,667 A * | 9/1986 | Marraccini et al. .......... 546/14 |
| 4,845,223 A * | 7/1989 | Seybold et al. .............. 546/37 |
| 5,154,770 A * | 10/1992 | Spietschka et al. ......... 106/498 |
| 5,466,807 A | 11/1995 | Dietz et al. .................... 546/6 |
| 5,948,910 A | 9/1999 | Bauer et al. ................ 544/198 |
| 6,102,996 A | 8/2000 | Parazak ................... 106/31.25 |
| 6,166,210 A * | 12/2000 | Langhals et al. ............. 546/37 |
| 6,221,150 B1 * | 4/2001 | Weber et al. ............... 106/498 |
| 6,491,749 B1 * | 12/2002 | Langhals et al. ....... 106/287.21 |
| 6,524,383 B2 | 2/2003 | Komatsu et al. ............ 106/493 |
| 6,890,377 B2 * | 5/2005 | Bohm et al. .............. 106/31.47 |
| 2003/0019398 A1 | 1/2003 | Komatsu ey al. ............ 106/412 |
| 2003/0181721 A1 * | 9/2003 | Wurthner et al. ............. 546/37 |

FOREIGN PATENT DOCUMENTS

| | | |
|---|---|---|
| DE | 3706513 | 8/1988 |
| EP | 0446748 | 9/1991 |
| EP | 1 172 422 A2 | 1/2002 |
| JP | 10-306216 | 11/1998 |

OTHER PUBLICATIONS

Derwent abstract of DE 3703513, Aug. 1987.*

* cited by examiner

Primary Examiner—Helene Klemanski
(74) Attorney, Agent, or Firm—Morgan Lewis & Bockius LLP

(57) ABSTRACT

An ink comprising a liquid medium and a colorant, wherein the liquid medium comprises water and a water-miscible organic solvent and the colorant is of Formula (1), wherein the colorant is dissolved in the liquid medium: Formula (1) wherein: each independently is a water-solubilising group selected from sulfo, carboxy, phosphato and poly(ethylene oxide); each Z independently is optionally substituted alkyl, optionally substituted aryl or optionally substituted aralkyl; each Q independently is a direct bond or —NR— wherein R is H, optionally substituted aryl or optionally substituted alkyl; rings A,B,C and D are each independently unsubstituted or carry a substituent selected from optionally substituted alkyl, optionally substituted aryl and optionally substituted aralkyl; each n independently is from 1 to 3; and each m independently is 0, 1 or 2; provided that when either or both of the groups represented by Q is a direct bond then at least one n has a value of at least 2. Also colourants and ink-jet printing processes, cartridges and prints

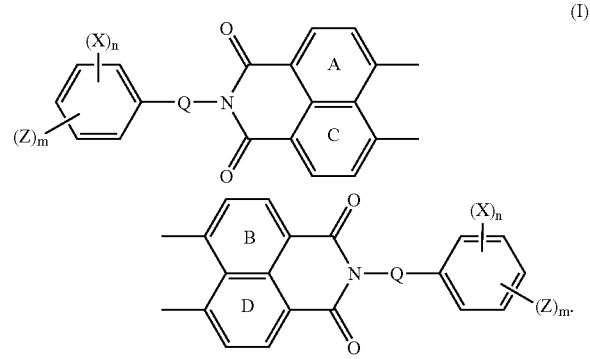

13 Claims, No Drawings

INKS CONTAINING WATER-SOLUBLE PERYLENE DYES AND THEIR USE IN INK-JET PRINTING

This invention relates to soluble perylene compounds as colorants, to inks and to the use of such inks in ink jet printing ("IJP").

IJP is a non-impact printing technique in which droplets of ink are ejected through a fine nozzle onto a substrate without bringing the nozzle into contact with the substrate.

There are many demanding performance requirements for dyes and inks used in IJP. For example, they desirably provide sharp, non-feathered images having good water-fastness, light-fastness, ozone-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

DE 3703513 discloses sulfonated perylene compounds for use in electrophotography and photoconductor layers.

U.S. Pat. No. 5,943,910 discloses perylene compounds carrying triazinylamino groups.

JP 10-306216 discloses insoluble perylene compounds and their use in electrophotographic developing agents and ink jet recording inks.

With ever-increasing manufacturer and customer requirements in the ink jet field for long term print fastness there is a need for soluble magenta colorants and inks with improved properties and, in particular, improved light-fastness.

It has now been found that certain perylene compounds display excellent ozone fastness and are particularly suitable for use in ink jet printing.

Thus, according to a first aspect of the present invention there is provided an ink comprising a liquid medium and a colorant, wherein the liquid medium comprises water and a water-miscible organic solvent and the colorant is of Formula (1), wherein the colorant is dissolved in the liquid medium:

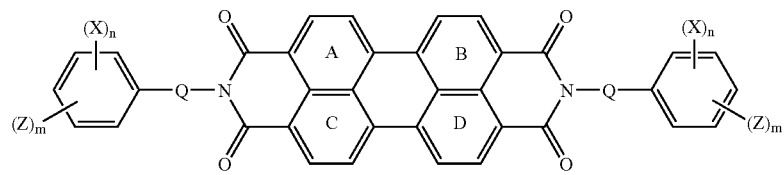

Formula (1)

wherein:
each X independently is a water-solubilising group selected from sulfo, carboxy, phosphato and poly(ethylene oxide);
each Z independently is optionally substituted alkyl, optionally substituted aryl or optionally substituted aralkyl;
each Q independently is a direct bond or —NR— wherein R is H, optionally substituted aryl or optionally substituted alkyl;
rings A,B,C and D are each independently unsubstituted or carry a substituent selected from optionally substituted alkyl, optionally substituted aryl and optionally substituted aralkyl;
each n independently is from 1 to 3; and
each m independently is 0, 1 or 2;

provided that when either or both of the groups represented by Q is a direct bond then at least one n has a value of at least 2.

Preferably at least one of the groups represented by X is a carboxy, sulfo or phosphate, more preferably all of the groups represented by X are independently selected from the group consisting of carboxy, sulfo and phosphate.

The sulfo, carboxy and phosphato groups represented by X are preferably in the free acid or salt form. Preferred salt forms are lithium, sodium, potassium, ammonium, substituted ammonium salts and mixtures thereof.

Preferably all the groups represented by X are independently carboxy or sulfo, more preferably all the groups represented by X are sulfo.

A preferred poly(ethylene oxide) is of the formula —O(CH$_2$CH$_2$O)$_p$H wherein p is from 1 to 100, more preferably from 1 to 70 and especially preferably from 2 to 50.

Preferred optionally substituted alkyl groups are $C_{1-30}$-optionally substituted alkyl, more preferably $C_{1-10}$-optionally substituted alkyl.

Preferred optionally substituted aryl groups are optionally substituted phenyl and optionally substituted naphthyl.

Preferred optionally substituted aralkyl groups are $C_{1-30}$ optionally substituted aralkyl, especially $C_{1-30}$ optionally substituted aralkyl containing optionally substituted naphthyl or optionally substituted phenyl moieties.

R is preferably $C_{1-30}$-optionally substituted alkyl, more preferably $C_{1-10}$-optionally substituted alkyl, especially $C_{1-4}$-optionally substituted alkyl and most preferably H.

Preferably both groups represented by R are the same, more preferably both groups represented by R are H.

Preferred optional substituents for the alkyl, aryl and aralkyl groups and for rings A, B, C and D are selected from $C_{1-4}$-alkyl, $C_{1-4}$-alkoxy, halo (especially Cl), nitro, cyano, hydroxy, phosphate, carboxy, ester and amide.

When any of the rings A, B, C and D carries a substituent, said substituent preferably contains from 1 to 30 carbon atoms, more preferably from 1 to 10 carbon atoms.

Rings A, B, C and D are preferably free from substituents.

Each n is preferably 2.

Preferably both n's are 2.

Each m is preferably 1 or 0, more preferably 0.

Preferably both m's are 0.

Preferably both n's are 2, both m's are 0 and the rings A, B, C and D are free from substituents, more preferably both n's are 2, both m's are 0, the rings A, B, C and D are free from substituent and Q is a direct bond, especially both n's are 2, both m's are 0, the rings A, B, C and D are free from substituents, Q is a direct bond and X is sulfo in the form of a free acid or salt form.

The inks of the present invention may contain two or more colorants of Formula (1).

The colorant of Formula (1) is preferably of Formula (2) or a salt thereof:

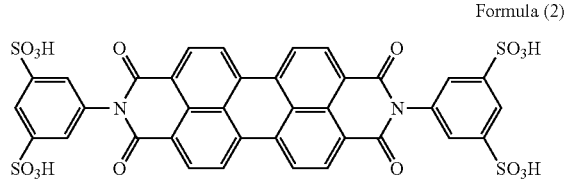

Formula (2)

Preferred water-miscible organic solvents for inclusion to the liquid medium include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy) ethanol, 2-(2-ethoxyethoxy)-ethanol, 2-[2-(2-methoxyethoxy) ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Preferably the weight ratio of water to water-miscible organic solvent Is from 99:1 to 1:99, more preferably from 99:1 to 50:50 and especially from 95:5 to 70:30.

Preferably the colorant of Formula (1) is present in the ink at from 0.01 to 40% based on the weight of the total ink, more preferably 0.5 to 20%, especially 0.5 to 10% and more especially 1 to 10%.

A preferred ink of the first aspect of the present invention comprises:

(a) from 0.01 to 40 parts of the colorant of Formula (1);
(b) from 10 to 99.8 parts of water; and
(c) from 0.01 to 40 parts of a water-miscible organic solvent;

wherein all parts are by weight and the number of parts (a)+(b)+(c)=100.

Inks of the first aspect of the present invention can be made by analogous methods to those known in the art. The order of addition or method of co-mixing of the ink components can be done in many readily conceivable ways.

A preferred method for making the ink is to mix a composition comprising of water and water-miscible organic solvent with a colorant of Formula (1).

Dissolution of the colorant in the liquid medium is preferably aided by gentle warming and/or stirring of the ink.

Preferably the ink is an ink-jet printing ink or a liquid dye concentrate. Concentrates are useful as a means for transporting colorant and so minimising costs associated with drying the dye and transporting excess liquid.

Inks according to the invention are preferably prepared using high purity ingredients and/or by purifying the composition after it has been prepared. Suitable purification techniques are well known, e.g. ultrafiltration, reverse osmosis, ion exchange and combinations thereof (either before or after they are incorporated in a composition according to the present invention). This purification results in the removal of substantially all of the inorganic salts and by-products resulting from its synthesis. Such purification assists in the preparation of a low viscosity solutions suitable for use in an ink-jet printer.

Preferably the ink has a viscosity of less than 20 cP, more preferably less than 10 cP, especially less than 5 cP, at 25° C. These low viscosity inks are particularly well suited for application to substrates by means of ink-jet printers.

Preferably the ink contains less than 500 ppm, more preferably less than 250 ppm, especially less than 100 pm, more especially less than 10 ppm in total of divalent and trivalent metal ions (other than any divalent and trivalent metal ions bound to a component of the composition).

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably the ink contains less than 500 ppm, more preferably less than 250 ppm, especially less than 100 pm, more especially less than 10 ppm in total of halide ions.

The surface tension of the ink is preferably In the range 20–65 dynes/cm, more preferably in the range 30–60 dynes/cm.

A particularly preferred ink is an ink-jet printing ink that has a viscosity of less than 20 cP at 25° C.; contains less than 500 ppm in total of divalent and trivalent metal ions (other than any divalent and trivalent metal ions bound to a component of the ink); contains less than 500 ppm halide ions; and has been filtered through a filter having a mean pore size below 10 μm.

The ink may, of course, also contain additional components conventionally used in ink jet printing inks, for example viscosity modifiers, pH buffers (e.g. 1:9 citric acid/sodium citrate) corrosion inhibitors, surfactants, biocides and kogation reducing additives.

The inks of the present invention demonstrate good ozone fastness, humidity fastness and especially light fastness on a range of media. Perylene compounds are known to fluoresce which suggests utility of the inks of the present invention in applications where fluorescence is utilised.

According to a second aspect of the present invention there is provided a process for printing an image on a substrate comprising applying an ink according to the first aspect of the present invention to the substrate by means of an ink jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. More especially photographic quality paper is preferred.

According to a third aspect of the present invention there is provided a paper, an overhead projector slide or a textile material printed with an ink according to the first aspect of the present invention. Preferably this is printed by means of a process according the second aspect of the present invention. Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper (available from Xerox).

Preferred plastic films are transparent polymeric films, especially those suitable for use as overhead projector slides, for example polyesters (especially polyethylene terephthalate), polycarbonates, polyimides, polystyrenes, polyether sulfones, cellulose diacetate and cellulose triacetate films.

It is especially preferred that the third aspect of the invention is a photographic quality print.

According to a fourth aspect of the present invention there is provided an ink jet printer cartridge comprising a chamber and an ink wherein the ink is present in the chamber and the ink is according to the first aspect of the present invention.

According to a fifth aspect of the present invention, there is provided a colorant of Formula (5):

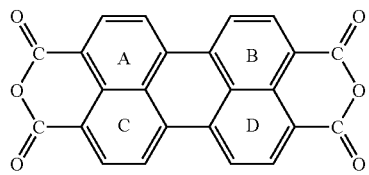

Formula (3)

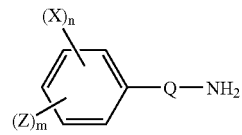

Formula (4)

wherein rings A, B, C and D and substituents X, Z, m, n and Q are as hereinbefore defined.

The reaction is preferably performed at a temperature of 100 to 200° C. A typical reaction time is 1 to 4 hours, preferably approximately 2 hours. Preferably the reaction is performed in the presence of an inert solvent and a catalyst (e.g. zinc acetate dihydrate).

The invention is further illustrated by the following Examples in which all parts and percentages are by weight unless specified otherwise.

EXAMPLE 1

Preparation of Dye (1)

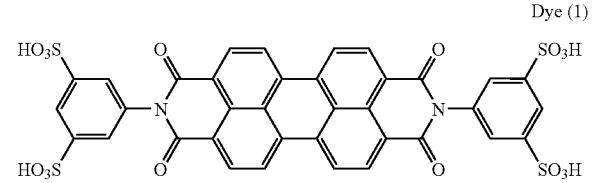

Dye (1)

3,4,9,10-Perylenetetracarboxylic dianhydride (1.96 g, 0.005 moles), aniline-3,5-disulfonic acid (9.36 g, 0.037 moles), zinc acetate dihydrate (0.7 g, 0.0032 moles) and imidazole (28 g, 0.41 moles) were intimately mixed together

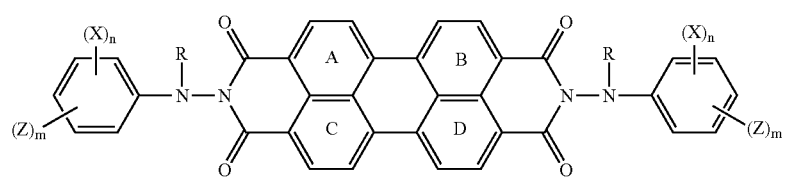

Formula (5)

wherein X, Z, R, n, m and rings A, B, C and D are as hereinbefore defined and the preferences for these features are as described above.

The colorants of Formula (1) may be prepared by the reaction of a compound of Formula (3) with a compound of Formula (4):

and heated at 140–150° C. for 2 hours with good agitation. The mixture was cooled to 100° C., then poured slowly into ethanol (500 ml). After stirring for 5 minutes, a precipitate was filtered off and washed well with further ethanol. The washed precipitate, which contained a substantial amount of aniline-3,5-disulfonic acid, was added to water (300 ml) and the pH adjusted to pH10 with 2M sodium hydroxide solution to give a solution. This solution was then transferred to Visking tubing and dialysed to completely remove the unwanted aniline-3,5-disulfonic acid, until liquid chromatography indicated none remained. The purified solution was then filtered and the filtrate evaporated to dryness to give Dye (1), as the tetrasodium salt, 4.2 g, 0.0044 moles and 88% yield.

EXAMPLE 2

Preparation of Dye (2)

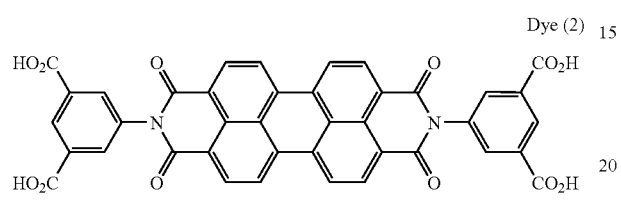

Dye (2)

Dye (2) was prepared using an analogous process to that described in Example 1 except that 5-aminoisophthalic acid was used in place of aniline-3,5-disulfonic acid.

EXAMPLE 3

Preparation of Dye (3)

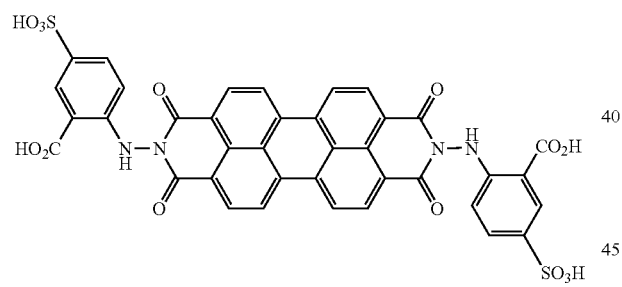

Dye (3)

Dye (3) was prepared using an analogous process to that described in Example 1 except that 2-hydrazino-5-sulfobenzoic acid was used in place of aniline-3,5-disulfonic acid.

EXAMPLE 4

Preparation of Dye (4)

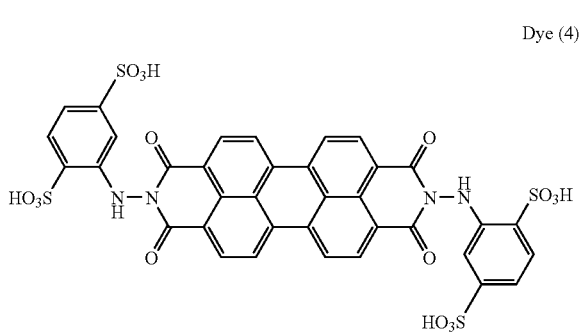

Dye (4)

Dye (4) was prepared using an analogous process to that described in Example 1 except that 2-hydrazino-1,4-disulfonic acid was used in place of aniline-3,5-disulfonic acid.

COMPARATIVE EXAMPLES

Comparative Dye (1) was prepared according to the procedure described in U.S. Pat. No. 5,948,910, Example 1.

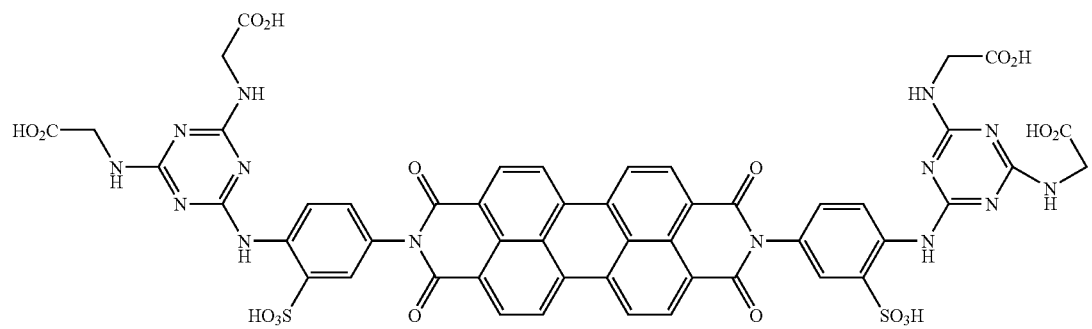

Comparative Dye (1)

Comparative Dye (2) was prepared using an analogous process to that described in U.S. Pat. No. 5,948,910, Example 1, except that 3-mercapto propane sulfonic acid (2.7 g) was used in place of gylcine.

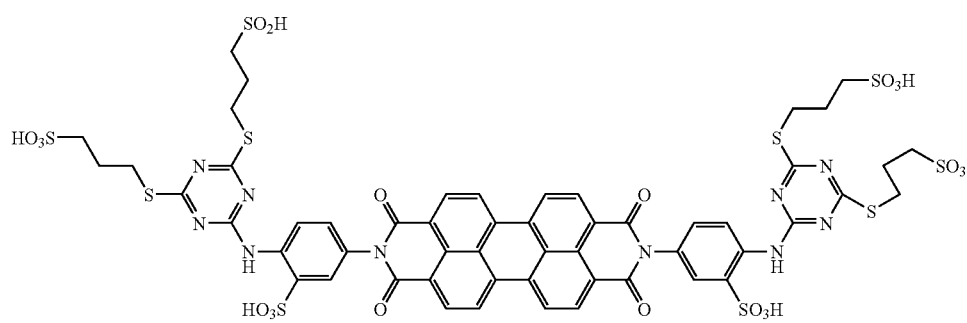

Comparative Dye (2)

EXAMPLE 5

Inks and Ink-Jet Printing

Inks were made by dissolving the dye described in Example 1, Comparative Dye 1 or Comparative Dye 2 (3.5 parts) in the following liquid medium (96.5 parts adjusted to pH 9.5 with ammonium hydroxide):
5 parts 2-pyrrolidone;
5 parts thiodiglycol;
2 parts Surfynol™ 465 (a non-ionic surfactant available from Air Products Inc.); and
88 parts water.

The resulting inks were filtered through a 0.45 μm filter. These inks were then printed using an Epson 880 printer onto Epson Premium Photo paper (SEC PM), Canon PR101 Photo paper (PR101) and Hewlett-Packard Premium Plus Photo paper (HPPP).

(a) Initial Print Measurements

The optical density (OD) of each initial print (OD Initial) were measured using a X-Rite 983™ Spectrodensitometer with 0°/45° measuring geometry, with a spectral range of 400–700 nm at 20 nm spectral intervals, using illuminant C, with a 2° (CIE 1931) observer angle and a density operation status of T. No less than 2 measurements were taken diagonally across a solid colour block on the print with a size greater than 10 mm×10 mm.

(b) Light-Fastness (LF) 4 Years

One set of the initial prints was tested for light fastness (LF) in a 4 years equivalent accelerated exposure test. Prints were exposed to light provided by a Xenon Arc lamp for 100 hrs in an Atlas Ci5000 Weatherometer.

After the exposure tests, the OD were remeasured (OD Final).

Results

TABLE 1

|  | % OD Loss HPPP | % OD Loss PR101 | % OD Loss SEC PM |
|---|---|---|---|
| Ink 1 | 14 | 50 | 20 |
| Comparative Ink 1 | 25 | 61 | 36 |
| Comparative Ink 2 | 32 | 60 | 40 |

Table 1 shows (row 1) an ink of the present invention and comparative inks (rows 2 and 3). Column 2 shows results for the degree of fade for printing on Hewlett-Packard Premium Plus Photopaper™, column 3 shows results for the degree of fade for printing on Canon PR101 Photopaper™ and columns 4 shows results for the degree of fade for printing on Epson Premium Photopaper™.

Table 1 shows that the inks of the present invention have a lower % OD loss on exposure to light (i.e. higher light fastness) than the comparative dyes.

EXAMPLES 6

Inks

The inks described in Tables A and B may be prepared by dissolving the colorant indicated in column 1, in the amount indicated by column 2, in the liquid medium shown in columns 3 to 13 to give solutions. All the solutions were adjusted to pH 9.5 with ammonia solution. The resulting solutions were then filtered to give the final inks.

The inks may be applied to paper by thermal or piezo ink jet printing.

The following abbreviations are used in Tables A and B:

PG = propylene glycol
NMP = N-methyl pyrrolidone
IPA = isopropanol
2P = 2-pyrollidone
P12 = propane-1,2-diol
CET = cetyl ammonium bromide
TBT = tertiary butanol
DEG = diethylene glycol
DMK = dimethylketone
MEOH = methanol
MIBK = methylisobutyl ketone
BDL = butane-2,3-diol
PHO = $Na_2HPO_4$ and
TDG = 1,3-bis(2-hydroxyethyl) urea

TABLE A

| Colorant | Colorant Content | Water | PG | DEG | NMP | DMK | NaOH | Na Stearate | IPA | MEOH | 2P | MIBK |
|---|---|---|---|---|---|---|---|---|---|---|---|---|
| (1) | 2.0 | 80 | 5 | | 6 | 4 | | | | | 5 | |
| (1) | 3.0 | 90 | | 5 | 5 | | 0.2 | | | | | |
| (1) | 10.0 | 85 | 3 | | 3 | 3 | | | | 5 | 1 | |
| (1) | 2.1 | 91 | | 8 | | | | | | | | 1 |
| (1) | 3.1 | 86 | 5 | | | | | 0.2 | 4 | | | 5 |
| (1) | 1.1 | 81 | | | 9 | | 0.5 | 0.5 | | | 9 | |
| (1) | 2.5 | 60 | 4 | 15 | 3 | 3 | | | 6 | 10 | 5 | 4 |
| (1) | 5 | 65 | | 20 | | | | | 10 | | | |
| (1) | 2.4 | 75 | 5 | 4 | | 5 | | | | 6 | | 5 |
| (1) | 4.1 | 80 | 3 | 5 | 2 | 10 | | 0.3 | | | | |
| (2) | 3.2 | 65 | | 5 | 4 | 6 | | | 5 | 4 | 6 | 5 |
| (2) | 5.1 | 96 | | | | | | | | 4 | | |
| (2) | 10.8 | 90 | 5 | | | | | | 5 | | | |
| (2) | 10.0 | 80 | 2 | 6 | 2 | 5 | | | 1 | | 4 | |
| (2) | 1.8 | 80 | | 5 | | | | | | | 15 | |
| (2) | 2.6 | 84 | | | 11 | | | | | | 5 | |
| (2) | 3.3 | 80 | 2 | | | 10 | | | | 2 | | 6 |
| (2) | 12.0 | 90 | | | 7 | | 0.3 | | 3 | | | |
| (2) | 5.4 | 69 | 2 | 20 | 2 | 1 | | | | | 3 | 3 |
| (2) | 6.0 | 91 | | | 4 | | | | | | 5 | |

TABLE B

| Colorant | Colorant Content | Water | PG | DEG | NMP | CET | TBT | TDG | BDL | PHO | 2P | P12 |
|---|---|---|---|---|---|---|---|---|---|---|---|---|
| (1) | 3.0 | 80 | 15 | | | 0.2 | | | | | 5 | |
| (1) | 9.0 | 90 | | 5 | | | | | | 1.2 | | 5 |
| (1) | 1.5 | 85 | 5 | 5 | | 0.15 | 5.0 | 0.2 | | | | |
| (1) | 2.5 | 90 | | 6 | 4 | | | | | 0.12 | | |
| (1) | 3.1 | 82 | 4 | 8 | | 0.3 | | | | | | 6 |
| (1) | 0.9 | 85 | | 10 | | | | | 5 | 0.2 | | |
| (1) | 8.0 | 90 | | 5 | 5 | | | 0.3 | | | | |
| (1) | 4.0 | 70 | | 10 | 4 | | | | 1 | | 4 | 11 |
| (1) | 2.2 | 75 | 4 | 10 | 3 | | | | 2 | | 6 | |
| (1) | 10.0 | 91 | | | 6 | | | | | | 3 | |
| (2) | 9.0 | 76 | | 9 | 7 | | 3.0 | | | 0.95 | 5 | |
| (2) | 5.0 | 78 | 5 | 11 | | | | | | | 6 | |
| (2) | 5.4 | 86 | | | 7 | | | | | | 7 | |
| (2) | 2.1 | 70 | 5 | 5 | 5 | 0.1 | 0.2 | 0.1 | 5 | 0.1 | 5 | |
| (2) | 2.0 | 90 | | | 10 | | | | | | | |
| (2) | 2 | 88 | | | | | | 10 | | | | |
| (2) | 5 | 78 | | | 5 | | | 12 | | 5 | | |
| (2) | 8 | 70 | 2 | | 8 | | | 15 | | 5 | | |
| (2) | 10 | 80 | | | | | | 8 | | 12 | | |
| (2) | 10 | 80 | | | 10 | | | | | | | |

The invention claimed is:

1. An ink jet printer cartridge comprising a chamber and an ink wherein the ink is present in the chamber and the ink comprises a liquid medium and a colorant, wherein the liquid medium comprises water and a water-miscible organic solvent and the colorant is of Formula (1), or a salt thereof, wherein the colorant is dissolved in the liquid medium:

Formula (1)

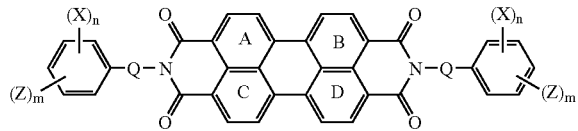

wherein:
  each X independently is a water-solubilising group selected from the group consisting of sulfo, carboxy, phosphato and poly(ethylene oxide);
  each Z independently is optionally substituted alkyl, optionally substituted aryl or optionally substituted aralkyl;
  each Q independently is a direct bond or —NR— wherein R is H, optionally substituted aryl or optionally substituted alkyl;
  rings A,B,C and D are each independently unsubstituted or carry a substituent selected from the group consisting of optionally substituted alkyl, optionally substituted aryl and optionally substituted aralkyl;
  each n independently is from 1 to 3; and
  each m independently is 0, 1 or 2;
  provided that when either or both of the groups represented by Q is a direct bond then at least one n has a value of at least 2.

2. An ink jet printer cartridge according to claim 1 wherein at least one of the groups represented by X is a carboxy, sulfo or phosphato.

3. An ink jet printer cartridge according to claim 1 or 2 wherein both n's are 2.

4. An ink jet printer cartridge according to claim 1 wherein both m's are 0.

5. An ink jet printer cartridge according to claim 4 wherein both n's are 2, both ms are 0, the rings A, B, C and D are free from substituents and Q is a direct bond.

6. An ink jet printer cartridge according to claim 1 wherein the colorant of Formula (1) is of Formula (2) or a salt thereof:

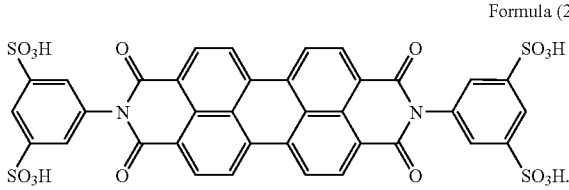

Formula (2)

7. An ink jet printer cartridge according to claim 1 wherein the ink comprises:
(a) from 0.01 to 40 parts of said colorant
(b) from 10 to 99.8 parts of water; and (c) from 0.01 to 40 parts of a water-miscible organic solvent; wherein all parts are by weight and the number of parts (a)+(b)+(c)=100.

8. An ink jet printer cartridge according to claim 1 wherein the ink has a viscosity of less than 20 mPa·s at 250° C.

9. An ink jet printer cartridge according to claim 1 wherein the ink has a viscosity of less than 20 cP at 25° C.; contains less than 500 ppm in total of divalent and trivalent metal ions other than any divalent and trivalent metal ions bound to a component of the ink; contains less than 500 ppm halide ions; and has been filtered through a filter having a mean pore size below 10 μm.

10. An ink jet printer cartridge according to claim 1 wherein the ink comprises two or more of said colorants.

11. A process for printing an image on a substrate comprising applying thereto an ink according to claim 1 by means of an ink jet printer.

12. A paper, an overhead projector slide or a textile material printed by a process according to claim 11.

13. A colorant of Formula (5) or a salt thereof:

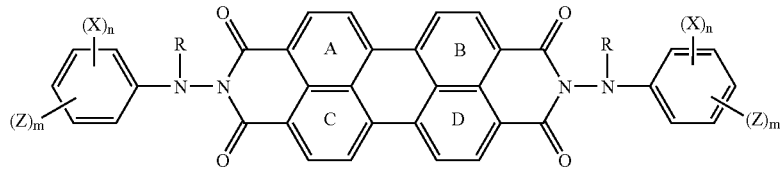

wherein:
each X independently is a water solubilising group selected from the group consisting of sulfo, carboxy, phosphato and poly(ethylene oxide);
each Z independently is H, optionally substituted alkyl, optionally substituted aryl or optionally substituted aralkyl;
each R independently is H, optionally substituted aryl or an optionally substituted alkyl;
each n independently is from 1 to 3;
each m independently is 0, 1 or 2;
rings A,B,C and D are each independently unsubstituted or carry a substituent selected from the group consisting of optionally substituted alkyl, optionally substituted aryl and optionally substituted aralkyl.

* * * * *